(12) United States Patent
Elie et al.

(10) Patent No.: US 11,371,848 B2
(45) Date of Patent: Jun. 28, 2022

(54) METHOD FOR CHARACTERISING AN INERTIAL MEASUREMENT UNIT

(71) Applicant: SAFRAN ELECTRONICS & DEFENSE, Paris (FR)

(72) Inventors: Philippe Elie, Paris (FR); Frédéric Davi, Paris (FR); Christian Lignon, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/416,282

(22) PCT Filed: Dec. 19, 2019

(86) PCT No.: PCT/EP2019/086286
§ 371 (c)(1),
(2) Date: Jun. 18, 2021

(87) PCT Pub. No.: WO2020/127716
PCT Pub. Date: Jun. 25, 2020

(65) Prior Publication Data
US 2022/0042803 A1  Feb. 10, 2022

(30) Foreign Application Priority Data
Dec. 21, 2018 (FR) ..................... 18 73747

(51) Int. Cl.
*G01C 21/16* (2006.01)
*G01C 19/00* (2013.01)
(Continued)

(52) U.S. Cl.
CPC ........... *G01C 21/183* (2020.08); *G01C 19/00* (2013.01); *G01C 25/005* (2013.01); *G01P 15/08* (2013.01); *G01P 15/18* (2013.01)

(58) Field of Classification Search
CPC .... G01C 21/183; G01C 19/00; G01C 25/005; G01C 21/16; G01P 15/18; G01P 15/08
See application file for complete search history.

(56) References Cited

U.S. PATENT DOCUMENTS 8,156,806 B1 * 4/2012 Cardarelli .............. G01C 21/16
73/511
8,464,433 B1 * 6/2013 Cardarelli .............. G01C 19/38
33/318
(Continued)

FOREIGN PATENT DOCUMENTS

CN      108225374 A      6/2018

OTHER PUBLICATIONS

Naser El-Sheimy et al., "Analysis and Modeling of Inertial Sensors Using Allan Variance," IEEE Transactions on Instrumentation and Measurement, IEEE Service Center, Piscataway, NJ, US, vol. 57, Issue No. 1, Jan. 1, 2008, pp. 140-149 (XP-055615956).
(Continued)

*Primary Examiner* — Helen C Kwok
(74) *Attorney, Agent, or Firm* — Muncy, Geissler, Olds & Lowe, P.C.

(57) ABSTRACT

A method of characterizing an inertial measurement unit includes a block carrying one accelerometer positioned on an axis of a measurement reference frame and having one gyro arranged to determine the orientation of the frame relative to an inertial reference frame. The method includes keeping the inertial measurement unit centered on a point that is stationary relative to the ground and that is in a predetermined environment, to obtain accelerometer signals that are images of at least one component of the specific force vector in the measurement reference frame and also gyro signals that are images of at least one component of the instantaneous rotation of the measurement reference frame; processing the signals to obtain data representative of pro-
(Continued)

jecting of the specific force vector into the inertial reference frame, after compensating for rotation of the Earth; and calculating Allan variance on the data and comparing it with reference data.

8 Claims, 2 Drawing Sheets

(51) Int. Cl.
  *G01P 15/08* (2006.01)
  *G01P 15/18* (2013.01)
  *G01C 25/00* (2006.01)

(56) References Cited

U.S. PATENT DOCUMENTS

| | | | | |
|---|---|---|---|---|
| 2012/0173196 | A1* | 7/2012 | Miszewski | E21B 47/024 702/151 |
| 2012/0245839 | A1* | 9/2012 | Syed | G01C 21/165 701/408 |
| 2016/0055679 | A1* | 2/2016 | Menozzi | G06F 11/00 345/633 |
| 2018/0231385 | A1* | 8/2018 | Fourie | G01C 22/00 |
| 2018/0356226 | A1* | 12/2018 | Beitia | G01C 21/18 |
| 2019/0169979 | A1* | 6/2019 | Nguyen | E21B 47/013 |
| 2021/0348924 | A1* | 11/2021 | Xue | E21B 47/022 |

OTHER PUBLICATIONS

Songlai Han et al., "Quantization and Colored Noises Error Modeling for Inertial Sensors for GPS/INS Integration," IEEE Sensors Journal, IEEE Service Center, New York, NY, US, vol. 11, Issue No. 6, Jun. 1, 2011, pp. 1493-1503 (XP-011354651).

Bistrov, V, "Study of the Characteristics of Random Errors in Measurements by MEMS Inertial Sensors," Automatic Control and Computer Sciences, Allerton Press, Inc, Heidelberg, vol. 45, Issue No. 5, Nov. 9, 2011, pp. 284-292 (XP-019974431).

Wen, Kai et al., "Inertial Navigation System Positioning Error Analysis and Cramér-Rao Lower Bound," 2016 IEEE/ION Position, Location and Navigation Symposium (Plans), IEEE, Apr. 11, 2016, pp. 213-218 (XP032905795).

Eldesoky, Abdalla et al., "Performance Enhancement of Low-Cost MEMS Inertial Sensors Using Extensive Calibration Technique," 2017 34$^{th}$ National Radio Science Conference (NRSC), IEEE, Mar. 13, 2017, pp. 415-424 (XP-033084353).

* cited by examiner

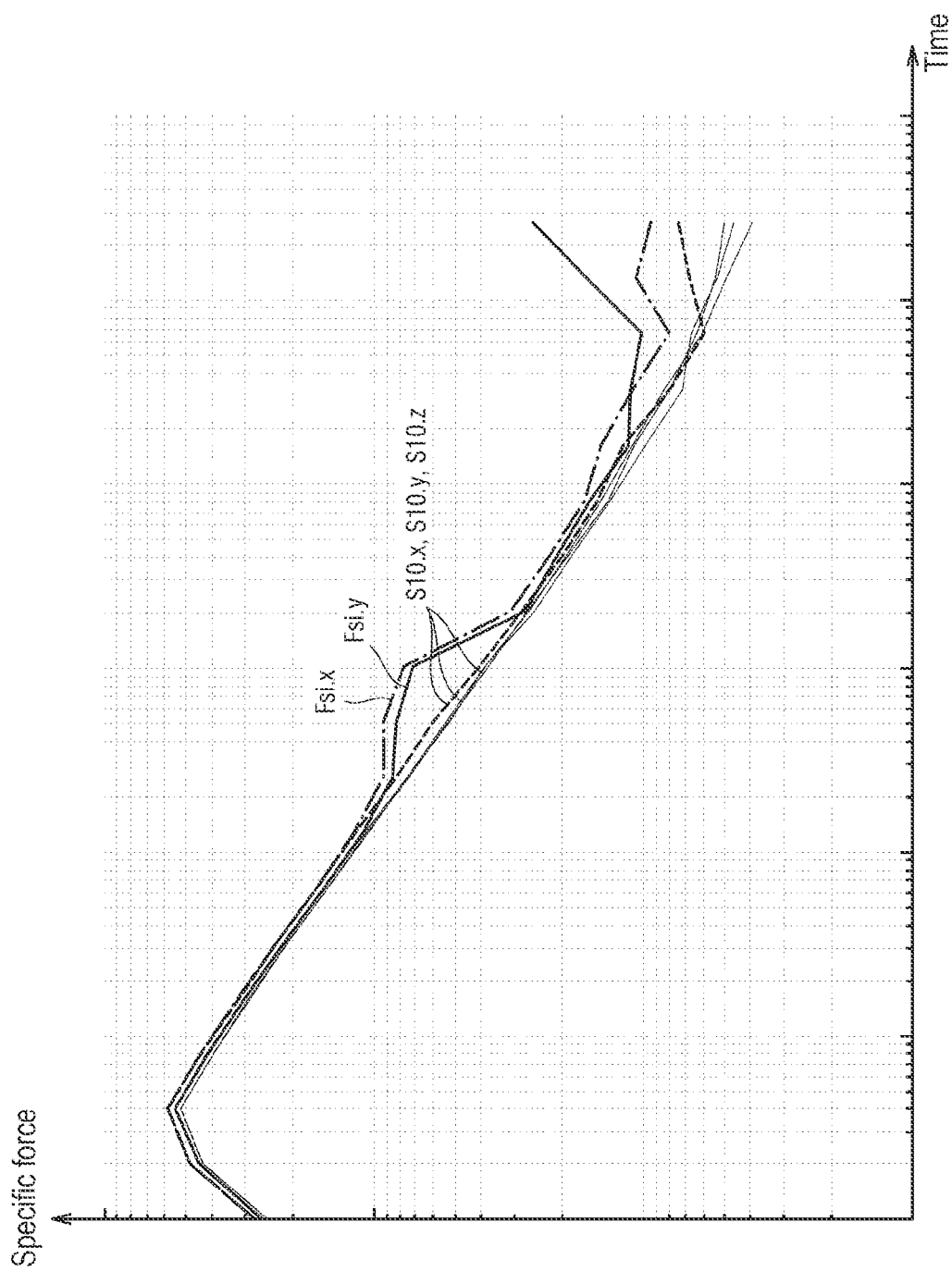

METHOD FOR CHARACTERISING AN INERTIAL MEASUREMENT UNIT

The present invention relates to the field of inertial measurement, in particular for navigation purposes.

TECHNOLOGICAL BACKGROUND

Inertial measurements for navigation purposes are usually supplied by inertial measurement units (IMUs) that comprise a block carrying three accelerometers having respective sensing axes, each positioned along a respective axis of a measurement reference frame, and also three angular sensors arranged to determine the orientation of the measurement reference frame relative to an inertial reference frame. The accelerometers measure the components of a "specific force" vector. The angular sensors are gyros, which may be free gyros or rate gyros. Free gyros determine the orientation of the specific force vector in the inertial reference frame. Using rate gyros instead of free gyros also makes it possible, after integration, to determine the orientation of the specific force vector. This integration consists in using a conventional method of the WILCOS type to integrate the instantaneous rotation vector of the quaternion established by the outputs from the rate gyros that represent angle increments. Calculating the difference between the specific force vector and the field of gravity provides the acceleration, which is then integrated in order to provide navigation data.

In order to characterize an inertial measurement unit, i.e. in order to determine the capability of the inertial measurement unit to supply measurements that are compatible with the accuracy required for the intended application, it is known to place each of the inertial sensors on a table/platform that is centered on a fixed point, and to determine the Allan variance curve for each of them. These curves are then used in a model of inertial navigation errors, e.g. using effective covariance. This does not enable the inertial measurement unit to be characterized globally, simply, and quickly.

In order to characterize an inertial measurement unit globally, it is necessary, at present, for the unit to be incorporated in a navigation system and to execute an inertial navigation algorithm making provision for calibration, alignment, and navigation. However, that method is neither simple nor quick.

OBJECT OF THE INVENTION

An object of the invention is to provide means for characterizing an inertial measurement unit.

BRIEF SUMMARY OF THE INVENTION

To this end, the invention provides a method of characterizing an inertial measurement unit comprising a block carrying at least one accelerometer having a sensing axis positioned on an axis of a measurement reference frame and having at least one inertial angular sensor arranged to determine the orientation of the measurement reference frame relative to an inertial reference frame. The method comprises the steps of:
 keeping the inertial measurement unit centered on a point that is stationary relative to the ground and that is in a predetermined environment, in order to obtain accelerometer signals that are images of at least one component of the specific force vector in the measurement reference frame and also angular signals that are images of at least one component of the instantaneous rotation of the measurement reference frame relative to an inertial reference frame;
 processing the signals in order to obtain data representative of projecting the specific force vector into the inertial reference frame after compensating the projection for the rotation of the Earth about the measurement axis of the inertial angular sensor; and
 calculating Allan variance on the data and comparing it with reference data.

Since the inertial measurement unit is kept centered on a point that is stationary relative to the ground, the measured specific force is theoretically equal to gravity. If this is not true for the measurements supplied by the inertial measurement unit, then the difference is due to errors, and mainly to gyro errors, which are known to contribute the majority of the total error. The method of the invention makes use of the measurements as supplied directly by the inertial measurement unit and it calculates Allan variance on data obtained by processing these measurements in relatively simple manner, namely projecting the specific force vector into an inertial reference frame and compensating the projection for the rotation of the Earth about the sensing axes of the gyros. The Allan variance obtained by performing the method of the invention provides an asymptotic value for performance in measuring the specific force. This performance value is representative of the capability of the inertial measurement unit to supply measurements that are compatible with the accuracy required for the intended application. The method of the invention thus makes it pointless to process the measurements from the inertial measurement unit in a navigation algorithm.

In a preferred implementation, the block carries three accelerometers having respective sensing axes, each positioned on a respective axis of a measurement reference frame, and also three gyros arranged to determine the orientation of the measurement reference frame relative to an inertial reference frame.

Also preferably, one of the axes of the measurement reference frame is arranged vertically.

This serves to decouple the measurements supplied by the gyro corresponding to that axis relative to the measurements supplied by the other gyros: the errors contained in the measurements from said gyro are due solely to that gyro.

Advantageously, the predetermined environment includes a predetermined thermal component and/or a predetermined vibrational component and/or a predetermined magnetic component.

It is thus possible to characterize the inertial measurement unit in its conditions of use.

In a preferred implementation, the compensation for the rotation of the Earth is performed by using a model of order not less than 2, and advantageously a third order model.

Other characteristics and advantages of the invention appear on reading the following description of a particular and nonlimiting embodiment of the invention.

BRIEF DESCRIPTION OF THE DRAWINGS

Reference is made to the accompanying drawings, in which:

FIG. 2 is a plot of Allan variance curves obtained while performing the method.

DETAILED DESCRIPTION OF THE INVENTION

Figure 1:
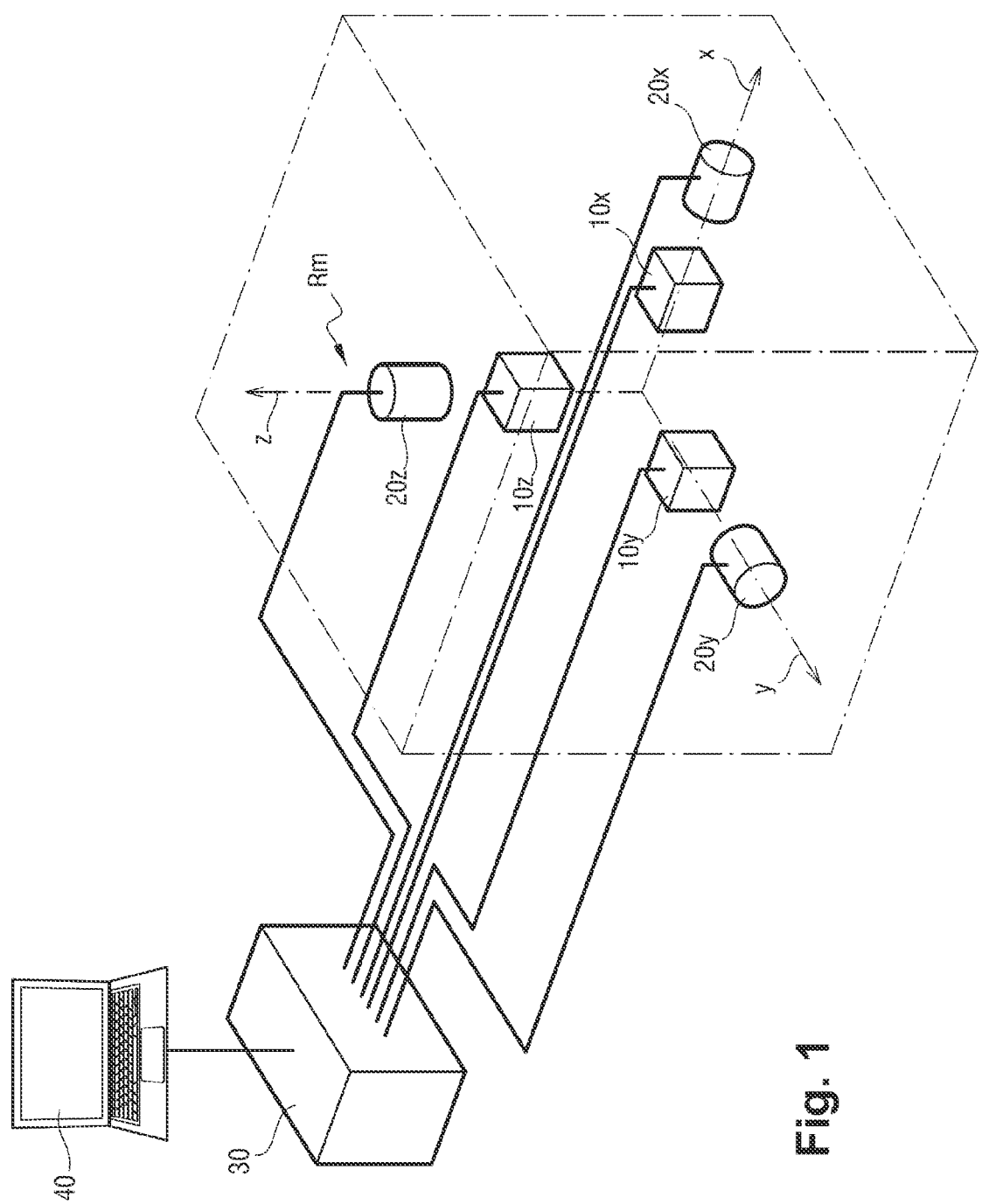
FIG. 1 is a diagrammatic view of an inertial measurement unit to which the method of the invention applied.

With reference to FIG. 1, the inertial measurement unit, given overall reference 1, comprises three accelerometers $10x$, $10y$, $10z$, and three rate gyros $20x$, $20y$, $20z$, which are arranged on the x, y, z axes of a measurement reference frame Rm. The accelerometers and the gyros are connected to an electronic processor circuit 30, which has six inputs and six outputs, i.e. one for each of the sensors $10x$, $10y$, $10z$, $20x$, $20y$, $20z$. The inertial measurement unit 1 is itself known. While the inertial measurement unit 1 is in use, said outputs are connected to an electronic processor circuit forming part of an inertial system.

The invention relates to a method of characterizing such an inertial measurement unit 1. The method is performed by means of a computer 40 connected to the outputs of the electronic processor circuit 30.

The computer 40 is arranged to execute a program including instructions for performing the method of the invention.

The inertial measurement unit 1 is placed on a testbench slab that is stationary relative to the ground. One of the axes of the measurement reference frame Rm is preferably arranged vertically since that serves to decouple the measurements of the corresponding gyro from the measurements of the other two gyros and facilitates processing of the measurements and determining the errors of the gyros.

In a variant, the inertial measurement unit 1 may be placed:
- on a vibrating platform in order to recreate an environment having a predetermined vibratory component;
- on a platform of the type having 1 axis or even 3 axes enabling an environment to be recreated with one or more predetermined rotary components;
- in an oven in order to recreate an environment having a predetermined thermal component; and/or
- in the vicinity of an electromagnetic device for recreating an environment having a predetermined magnetic component.

It is also possible to subject the inertial measurement unit 1 to an electric field, to particle radiation, to humidity, . . . in order to come as close as possible to the real conditions of use of the inertial measurement unit 1.

Under all circumstances, in order to perform invention, it is necessary to keep the inertial measurement unit 1 centered on a point that is stationary relative to the ground in the predetermined environment. Otherwise, it would be necessary to make use of a navigation algorithm in order to determine the movements of the inertial measurement unit so as to deduce the components relating to said movements in the signals supplied by the inertial measurement unit 1, which would complicate the method of the invention.

The inertial measurement unit 1 secured to the slab supplies the computer 40 with accelerometer signals $\Delta V$ that are images of the components of the specific force vector in the measurement reference frame Rm, and with gyro signals $\Delta\theta$ that are images of the instantaneous rotary components of the measurement reference frame Rm relative to an inertial reference frame I.

The program executed by the computer 40 processes the signals in order to obtain data representative of projecting of the specific force vector into the inertial reference frame I, after compensating for rotation of the Earth. This projection is performed in a manner that is itself known. Rotation of the Earth is compensated by using a third order model that is itself known.

The program executed by the computer 40 then calculates the Allan variance on this data. Allan variances are shown in the form of curves in FIG. 2, which plots time on a logarithmic scale along the abscissa axis and plots the above-mentioned representative data sampled at a sampling frequency, which in this example is 1 kilohertz (kHz). It can be seen in FIG. 2 that the curves Fsi.x and Fsi.y showing the Allan variances of the projection of the specific force into the inertial reference frame along the x-axis and along the y-axis present a bump, whereas the curves $S10.x$, $S10.y$ or $S10.z$ showing the Allan variances of the accelerometers do not have the bump.

The Allan variance values of the inertial specific forces of one inertial measurement unit can then be compared with the Allan variances of other inertial measurement units, said measurements being obtained with the method of the invention.

It is also possible to consider that the value of the Allan variance at the end of a predetermined length of time, e.g. one second, constitutes a value that characterizes the inertial measurement unit, and to compare said value with the same values as obtained for other inertial measurement units.

The Allan variance values of an inertial measurement unit can then be compared with measurement unit acceptability thresholds for a given application.

Naturally, the invention is not limited to the embodiment described and covers any variant coming within the ambit of the invention as defined by the claims.

In particular, the inertial measurement unit may have fewer accelerometers and fewer gyros. The invention is thus applicable to an inertial measurement unit that has an only one accelerometer and only one inertial angular sensor, both sharing the same sensing axis (e.g. in an application to an elevator). Consideration is then given solely to the projection of the specific force onto the sensing axis. In the same manner, compensation is applied only to the projection of the rotation of the Earth onto the single sensing axis. The invention is likewise applicable to an inertial measurement unit having two accelerometers and two inertial angular sensors.

The angular sensors used are gyros, which may be free gyros or rate gyros.

Compensation for the rotation of the Earth may be performed using a model of order not less than 2.

The sampling frequency may be other than 1 kHz.

The inertial measurement unit may be moved.

The invention is suitable for use in multiple applications, and in particular in the field of transport. By way of example, the invention is applicable to any type of vehicle, and in particular to aircraft, to land vehicles, to water vehicles, and to other vehicles such as elevators.

The invention claimed is:

1. A method of characterizing an inertial measurement unit comprising a block carrying at least one accelerometer having a sensing axis positioned on an axis of a measurement reference frame and having at least one inertial angular sensor arranged to determine an orientation of the measurement reference frame relative to an inertial reference frame, the method comprising the steps of:
  keeping the inertial measurement unit centered on a point that is stationary relative to the ground and that is in a predetermined environment, in order to obtain accelerometer signals that are images of at least one component of a specific force vector in the measurement reference frame and also angular signals that are images of at least one component of an instantaneous rotation of the measurement reference frame relative to the inertial reference frame;

processing the accelerometer signals and the angular signals in order to obtain data representative of a projection of the specific force vector into the inertial reference frame after compensating the projection for a rotation of the Earth about a measurement axis of the inertial angular sensor; and calculating Allan variance on the data and comparing the Allan variance with reference data.

2. The method according to claim 1, wherein the block carries three accelerometers having respective sensing axes, each positioned on a respective axis of the measurement reference frame, and also three gyros arranged to determine the orientation of the measurement reference frame relative to the inertial reference frame.

3. The method according to claim 2, wherein one of the axes of the measurement reference frame is arranged vertically.

4. The method according to claim 1, wherein the predetermined environment includes a predetermined thermal component.

5. The method according to claim 1, wherein the predetermined environment includes a predetermined vibratory component and/or a predetermined rotary component.

6. The method according to claim 1, wherein the predetermined environment includes a predetermined magnetic component.

7. The method according to claim 1, wherein the compensation for the rotation of the Earth is performed using a model of order not less than 2.

8. The method according to claim 1, wherein the compensation for the rotation of the Earth is performed using a third order model.

* * * * *